(12) United States Patent
Layton

(10) Patent No.: US 8,969,710 B2
(45) Date of Patent: Mar. 3, 2015

(54) PHOTON INDUCED ENHANCED FIELD ELECTRON EMISSION COLLECTOR

(71) Applicant: Phillip J. Layton, San Diego, CA (US)

(72) Inventor: Phillip J. Layton, San Diego, CA (US)

(73) Assignee: Pacific Integrated Energy, Inc., San Diego, CA (US)

( * ) Notice: Subject to any disclaimer, the term of this patent is extended or adjusted under 35 U.S.C. 154(b) by 27 days.

(21) Appl. No.: 13/932,936

(22) Filed: Jul. 1, 2013

(65) Prior Publication Data

US 2013/0319514 A1 Dec. 5, 2013

Related U.S. Application Data

(63) Continuation of application No. 12/259,104, filed on Oct. 27, 2009, now Pat. No. 8,507,785.

(60) Provisional application No. 60/985,841, filed on Nov. 6, 2007.

(51) Int. Cl.
*H01L 31/052* (2014.01)
*G02B 5/00* (2006.01)
*H01Q 15/02* (2006.01)
*F24J 2/00* (2014.01)
*H01J 29/04* (2006.01)
*H01Q 15/00* (2006.01)

(52) U.S. Cl.
CPC ............ *H01L 31/0522* (2013.01); *G02B 5/008* (2013.01); *H01Q 15/02* (2013.01); *F24J 2/00* (2013.01); *H01J 29/04* (2013.01); *H01Q 15/0073* (2013.01)
USPC ........................................................ 136/254

(58) Field of Classification Search
USPC ........................................................ 136/254
See application file for complete search history.

(56) References Cited

U.S. PATENT DOCUMENTS

| | | | |
|---|---|---|---|
| 3,994,012 | A | 11/1976 | Warner, Jr. |
| 4,000,503 | A | 12/1976 | Matare |
| 4,574,161 | A | 3/1986 | Marks |
| 4,720,642 | A | 1/1988 | Marks |

(Continued)

FOREIGN PATENT DOCUMENTS

| | | | |
|---|---|---|---|
| CN | 1263603 A | | 8/2000 |
| CN | 1930693 A | | 3/2007 |

(Continued)

OTHER PUBLICATIONS

"Flexible nanoantenna arrays capture abundant solar energy," Idaho National Laboratory, website news release, (https://in !portal in!.gov/portal/server.pt?open=514&objID=1555&mode=2&featurestory=DA_144483), Aug. 11, 2008, 2 pages as printed.

(Continued)

*Primary Examiner* — Golam Mowla
(74) *Attorney, Agent, or Firm* — Wilson Sonsini Goodrich & Rosati

(57) ABSTRACT

An electromagnetic energy collector and sensor use enhanced fields to emit electrons for energy collection. The collector and sensor collect energy from visible light, infrared radiation and ultraviolet electromagnetic radiation. The collector and sensor include a waveguide with a geometry selected to enhance the electric field along a conductor to create a high, localized electric field, which causes electron emission across a gap to a return plane.

20 Claims, 3 Drawing Sheets

(56) References Cited

U.S. PATENT DOCUMENTS

| | | |
|---|---|---|
| 5,461,280 A | 10/1995 | Kane |
| 5,973,259 A | 10/1999 | Edelson |
| 5,991,000 A | 11/1999 | Shimabukuro et al. |
| 6,020,677 A | 2/2000 | Blanchet-Fincher et al. |
| 6,091,186 A | 7/2000 | Cao et al. |
| 6,127,624 A | 10/2000 | Ishida et al. |
| 6,136,543 A | 10/2000 | Anazawa et al. |
| 6,180,415 B1 | 1/2001 | Schultz et al. |
| 6,242,193 B1 | 6/2001 | Anazawa et al. |
| 6,250,984 B1 | 6/2001 | Jin et al. |
| 6,283,812 B1 | 9/2001 | Jin et al. |
| 6,344,272 B1 | 2/2002 | Oldenburg et al. |
| 6,512,235 B1 | 1/2003 | Eitan et al. |
| 6,630,772 B1 | 10/2003 | Bower et al. |
| 6,741,019 B1 | 5/2004 | Filas et al. |
| 6,750,394 B2 | 6/2004 | Yamamoto et al. |
| 6,946,785 B2 | 9/2005 | Ito et al. |
| 7,064,474 B2 | 6/2006 | Liu et al. |
| 7,102,157 B2 | 9/2006 | Kastalsky et al. |
| 7,141,781 B2 | 11/2006 | Hagmann |
| 7,151,268 B2 | 12/2006 | Fujieda et al. |
| 7,157,848 B2 | 1/2007 | Tang et al. |
| 7,176,478 B2 | 2/2007 | Kastalsky et al. |
| 7,202,596 B2 | 4/2007 | Tang et al. |
| 7,217,404 B2 | 5/2007 | Ajayan et al. |
| 7,359,598 B2 | 4/2008 | Kim et al. |
| 7,365,632 B2 | 4/2008 | Bertin et al. |
| 7,408,147 B2 | 8/2008 | Blick et al. |
| 7,476,787 B2 | 1/2009 | Thomas et al. |
| 7,501,288 B2 | 3/2009 | Schultz et al. |
| 7,569,188 B2 | 8/2009 | Stockman et al. |
| 7,579,764 B2 | 8/2009 | Wei et al. |
| 8,507,785 B2 | 8/2013 | Layton |
| 2001/0002315 A1 | 5/2001 | Schultz et al. |
| 2004/0095050 A1 | 5/2004 | Liu et al. |
| 2004/0155184 A1 | 8/2004 | Stockman et al. |
| 2004/0181344 A1 | 9/2004 | Stephanopoulos et al. |
| 2004/0212290 A1 | 10/2004 | Ito et al. |
| 2004/0245910 A1 | 12/2004 | Tang et al. |
| 2004/0245911 A1 | 12/2004 | Tang et al. |
| 2005/0062973 A1 | 3/2005 | Kim et al. |
| 2005/0161668 A1 | 7/2005 | Kastalsky et al. |
| 2005/0247929 A1 | 11/2005 | Kastalsky et al. |
| 2006/0192115 A1 | 8/2006 | Thomas et al. |
| 2006/0210279 A1 | 9/2006 | Hillis et al. |
| 2007/0023621 A1 | 2/2007 | Blick et al. |
| 2007/0205723 A1 | 9/2007 | Sommerer et al. |
| 2007/0210956 A1 | 9/2007 | Hillis et al. |
| 2007/0236126 A1 | 10/2007 | Wei et al. |
| 2007/0289623 A1 | 12/2007 | Atwater |
| 2008/0002529 A1 | 1/2008 | Sekine et al. |
| 2008/0115817 A1 | 5/2008 | Defries |
| 2008/0218074 A1 | 9/2008 | Kastalsky |
| 2008/0236652 A1 | 10/2008 | Defries et al. |
| 2008/0258049 A1 | 10/2008 | Kuzmich et al. |
| 2008/0271778 A1 | 11/2008 | Defries et al. |
| 2009/0072161 A1 | 3/2009 | Ben-yakar et al. |
| 2009/0117002 A1 | 5/2009 | Kotov et al. |
| 2009/0117475 A1 | 5/2009 | Hyde et al. |
| 2009/0128002 A1 | 5/2009 | Hu |
| 2009/0130573 A1 | 5/2009 | Hyde et al. |
| 2009/0161104 A1 | 6/2009 | Schultz et al. |
| 2009/0203203 A1 | 8/2009 | Ernst et al. |
| 2009/0218516 A1 | 9/2009 | Gryczynski et al. |
| 2009/0229648 A1 | 9/2009 | Makansi |
| 2009/0236539 A1 | 9/2009 | Stockman et al. |
| 2009/0294692 A1 | 12/2009 | Bourke, Jr. et al. |
| 2009/0303573 A1 | 12/2009 | Hillis et al. |
| 2009/0308443 A1 | 12/2009 | Cutler |
| 2009/0321626 A1 | 12/2009 | Vertes et al. |
| 2010/0003316 A1 | 1/2010 | Vo Dinh et al. |
| 2010/0016783 A1 | 1/2010 | Bourke, Jr. et al. |
| 2010/0073802 A1 | 3/2010 | Komura et al. |
| 2010/0175745 A1 | 7/2010 | Kostecki et al. |
| 2011/0220172 A1 | 9/2011 | Layton |
| 2013/0294729 A1 | 11/2013 | Layton et al. |

FOREIGN PATENT DOCUMENTS

| | | |
|---|---|---|
| EP | 1279705 A1 | 1/2003 |
| EP | 1279183 B1 | 3/2006 |
| EP | 979409 B1 | 12/2006 |
| EP | 1739724 A1 | 1/2007 |
| EP | 1830387 A2 | 9/2007 |
| EP | 2112500 A1 | 10/2009 |
| EP | 1830387 A3 | 3/2011 |
| JP | 2007/273832 A | 10/2007 |
| JP | 2010/219399 A | 9/2010 |
| JP | 2011/171519 A | 9/2011 |
| WO | WO 89/10631 A1 | 11/1989 |
| WO | WO 98/13857 A1 | 4/1998 |
| WO | WO 98/21737 A1 | 5/1998 |
| WO | WO 98/37417 A1 | 8/1998 |
| WO | WO 01/84130 A2 | 11/2001 |
| WO | WO 01/84130 A3 | 6/2002 |
| WO | WO 03/042748 A1 | 5/2003 |
| WO | WO 2004/109738 A2 | 12/2004 |
| WO | WO 2004/113951 A2 | 12/2004 |
| WO | WO 2004/113951 A3 | 3/2005 |
| WO | WO 2004/109738 A3 | 5/2005 |
| WO | WO 2006/032950 A2 | 3/2006 |
| WO | WO 2006/032950 A3 | 10/2006 |
| WO | WO 2006/128181 A2 | 11/2006 |
| WO | WO 2007/003316 A1 | 1/2007 |
| WO | WO 2007/016113 A2 | 2/2007 |
| WO | WO 2006/128181 A3 | 5/2007 |
| WO | WO 2008/118234 A2 | 10/2008 |
| WO | WO 2007/016113 A3 | 12/2008 |
| WO | WO 2009/048695 A2 | 4/2009 |
| WO | WO 2009/105662 A1 | 8/2009 |
| WO | WO 2009/114567 A1 | 9/2009 |
| WO | WO 2009/124189 A1 | 10/2009 |
| WO | WO 2009/124970 A2 | 10/2009 |
| WO | WO 2009/130646 A1 | 10/2009 |
| WO | WO 2008/118234 A9 | 11/2009 |
| WO | WO 2009/048695 A3 | 12/2009 |
| WO | WO 2010/009106 A1 | 1/2010 |

OTHER PUBLICATIONS

"Harvesting the sun's energy with antennas," Idaho National Laboratory, website news article (https://inlportaLinl.gov/portal/serverpt?open=514&objID=1269&mode=2&featurestory=DA_101047), Copyright 2007, 3 pages as printed.

Collectors, Proceedings of ES2008, Energy Sustainability 2008, Aug. 10-14, 2008, ES2008-54016, Jacksonville, Florida, pp. 1-7.

Dionne, Sweatlock, Atwater and Polman, Plasmon slot Waveguides: Towards chip-scale propagation with subwavelength-scale localization, Physical Review B 73, 035407 (2006).

Dombi, P. and Racz, P., "Ultrafast monoenergetic electron source by optical waveform control of surface plasnnons," Optics Express, vol. 16, No. 5, pp. 2887-2893, Mar. 3, 2008.

Kotter, Dale K, Novack, Steven D., Slafer, W. Dennis, and Pinhero, Patrick, Solar Nantanna Electromagneti.

Laan, M., Aarik, J., Josephson, R., and Repan, V., "Low current mode of negative coronas: mechanism of electron emission," Journal of Physics D: Applied Physics, 36, 2667-2672, 2003.

Maier and Atwater, "Plasmonics: Localization and Guiding of Electromagnetic Energy in Metal/ Dielectric Structures," Journal of Applied Physics, vol. 98, No. 1, Article No. 011101, Jul. 2005.

Mayer, et al. Simulations of infrared and optical rectification by geometrically asymmetric metal-vacuum-metal junctions for applications in energy conversion devices. Nanotechnology. 2010; 21(14):145204-145211.

Office action dated Feb. 21, 2013 for U.S. Appl. No. 12/259,104.

Office action dated Sep. 25, 2012 for U.S. Appl. No. 12/259,104.

Pendry, J.B., Martin-Moreno, L., and Garcia-Vidal, F.J., Mimicking Surface Plasmons with Structured Surfaces, Science vol. 305, pp. 847-848, Aug. 6, 2004 DOI: 10.1126/science.1098999.

(56) References Cited

OTHER PUBLICATIONS

Repan, et al. Electric Field Modeling for Point-Plane Gap. Institute of Experimental Physics and Technology, University of Tartu, Tahe Estonia publication, 2002.

Repan, V., Laan, M. and Plank, T., "Electric Field Modelling for Point-Plane Gap, Institute of Experimental Physics and Technology," University of Tartu, Tahe 4, 51010 Tartu, Estonia, 2002.

Service, Robert F. Membrane Makes Plastic Precursor Deliver More Bag for the Buck. Science. 2008; 320(5883):1584. DOI: 10.1126/science.320.5883.1584a.

Stockman, Mark I., Kling, Matthias F., Kleineberg, Ulf and Krausz, Ferenc, "Attosecond nanoplasmonic-field microscope," Nature Photonics, vol. 1, pp. 539-544, Sep. 3, 2007.

U.S. Appl. No. 14/357,941, filed May 13, 2014, Juluri et al.

Atwater. The promise of plasmonics. Sci Am. Apr. 2007;296(4):56-63.

Bharadwaj, et al. Optical antennas. Advances in Optics and Photonics. 2009; 1:438-483.

Cowell, et al. Advancing MIM electronics: amorphous metal electrodes. Adv Mater. Jan. 4, 2011;23(0:74-8. doi: 10.1002/adma.201002678.

Dagenais, et al. Solar spectrum rectification using nano-antennas and tunneling diodes. Optoelectronic integrated circuits XII, Proceedings of SPIE. Feb. 12, 2010; vol. 7605.

Hao, et al. "High performance optical absorber based on a plasmonic metamaterial," Applied Physics Letters, vol. 96, No. 25, p. 251104, 2010.

Hedayati, et al. Design of a perfect black absorber at visible frequencies using plasmonic metamaterials. Adv Mater. Dec. 1, 2011;23(45):5410-4. doi: 10.1002/adma.201102646. Epub Oct. 14, 2011.

International search report and written opinion dated Feb. 9, 2012 for PCT/US2011/039671.

International search report and written opinion dated Mar. 18, 2013 for PCT Application No. US2012/064872.

Knight, et al. Photodetection with active optical antennas. Science. May 6, 2011;332(6030):702-4. doi: 10.1126/science.1203056.

Kreibig, et al. Optical Properties of Metal Clusters. Springer, 1995.

Lee, et al. Surface plasmon-driven hot electron flow probed with metal-semiconductor nanodiodes. Nano Lett. Oct. 12, 2011;11(10):4251-5. Epub Sep. 20, 2011.

Lin, et al. Polarization-independent broad-band nearly perfect absorbers in the visible regime. Opt Express. Jan. 17, 2011;19(2):415-424.

McFarland, et al. A photovoltaic device structure based on internal electron emission. Nature. Feb. 6, 2003;421(6923):616-8.

Muhlschlegal. Optical antennas. Ph.D. Thesis. University of Basel/Germany. Feb. 2006.

Notice of allowance dated Jun. 10, 2013 for U.S. Appl. No. 12/259,104.

Park, et al. Feed-Horn Antenna for Enhanced Uncooled Infrared Sensor Using Novel UV Lithography, Plastic Micromachining and Mesh Structure Bonding. Japanese Journal of Applied Physics. 2004; 43(6A):3320-3327.

PHOTON INDUCED ENHANCED FIELD ELECTRON EMISSION COLLECTOR

CROSS-REFERENCE

This application claims priority to U.S. patent application Ser. No. 12/259,104, now U.S. Pat. No. 8,507,785, which claims priority to U.S. Provisional Patent Application No. 60/985,841, filed on Nov. 6, 2007, which is incorporated in its entirety by reference herein.

BACKGROUND OF THE INVENTION

1. Field of the Invention

The invention disclosed herein relates generally to the field of electromagnetic energy collection, and, more specifically, relates to light energy collection.

2. Description of the Related Art

The system and method disclosed herein produce energy from sunlight by harvesting electromagnetic waves using a field concentrating method to create an electron emission from a distressed field source.

A combination of increasing worldwide energy demand, limited energy resources that are unable to keep up with the demand and the environmental impact of harvesting nonrenewable energy fossil fuels has created an increasing demand for clean affordable renewable energy.

One source of renewable clean energy is solar energy. Major solar energy collection technologies include 1) inorganic, semiconductor based photovoltaic (PV) generation, 2) organic based PV generation, 3) nanotechnology, which includes carbon nanotubes and quantum dots, and 4) solar thermal or solar concentrator technologies. These known technologies range from mature, commercially available technologies to technologies in very early stages of development. For example, silicon (semiconductor-based) PV technologies, solar thermal technologies and solar concentrator technologies are the most widely used currently commercially available and mature technologies.

Most existing photovoltaic technology use quantum bandgap potentials generated by p-doped and n-doped semiconductor material to collect energy from light. For example, U.S. Pat. No. 3,994,012 to Warner, Jr., for Photovoltaic Semiconductor Devices describes one such method for making a single-crystalline photovoltaic inorganic semiconductor PV technology that includes amorphous silicon (a-Si), copper indium diselenide (CIS), copper indium gallium diselenide (GIGS), cadmium telluride (CdTe) and other variants of increasing efficiency using triple junctions. Typical inorganic PV efficiencies range from 10% for the single-junction cells up to around 28% for triple-junction PV cells. PV technology is limited physically to less than 33% energy collection efficiency by bandgap energy collection limitations and by semiconductor electrical resistance.

The biggest cost issues associated with semiconductor-based PV are the cost of materials and the cost of the manufacturing process. The material costs include the high cost to produce pure wafers and the use of rare and expensive materials. The manufacturing costs include the huge capital cost to build a semiconductor facility, the control of toxic materials used and the cleanliness requirement to prevent any impurities from doping the product while under manufacture. These costs are reasonable for integrated circuit (IC) electronics because smaller is better and because the entire required function of a device can be located in an area that is typically under a square centimeter. Accordingly, many devices can be produced on a single wafer.

In contrast to the needs for IC electronics, solar collection technology requires large areas to collect light. The large area requirement provides an inherent limitation to devices that use expensive processes because of the surface area cost to generate PV-based solar energy. Therefore, the cost restrictions of inorganic-based PVs limit the ability to provide a significant portion of the US and world demands for electricity without a major paradigm shift in the way the PV devices are produced.

The cost of current PV technology is estimated to be $4.6 to $6 per watt. In contrast, other sources of energy, such as fossil fuels, have a cost of approximately $1 per watt. To be truly competitive with other current sources of energy requires the PV cost to be reduced to a range of around $1 per watt.

Another major downside for current PV technology is the use of toxic materials during the processing steps and in the end materials produced, particularly with respect to the newer triple-junction cells. After the end of life of prior art PV devices, the toxic materials create an environmental disposal problem.

Solar thermal is a currently viable technology for large-scale applications. Thermal electric generators either use steam (large application), Stirling engines for medium applications or the Seebeck effect for smaller applications. Such solar thermal methods have thermal loses. Typically, solar thermal energy requires large operations to reach economic viability, which requires the system deployment to be located far from the source of demand. This requires long-distance transmission lines that can have transmission losses as great as 30%. Furthermore, the transmission lines and the supporting towers add cost in land and materials, and may have a negative environmental impact on the surfaces underlying the transmission lines.

Another category of technology that collects photon energy includes sensors that use voltage enhanced field emission. Such devices use high voltages to detect typically low-intensity photons using the photoelectric effect. Such devices have a net energy loss and amplify a signal using an external power source. These devices consume more energy then they produce and are not useful as energy collectors.

Another new category of technology is based on a recent finding that electric field enhancement on existing detectors can improve the performance of photodetectors. This method of enhancement uses surface structures to enhance the electric field in desired locations. Currently, this method is being investigated for use in conjunction with semiconductor-based PV devices to improve the performance of PV devices. The enhanced electric fields created in accordance with this category of technology allow greater electron mobility in devices.

New areas of research have the potential to dramatically reduce cost if the results of the research can improve efficiency. Such new areas include organic PV and nanotechnology. Organic dye-sensitized PV, although currently inefficient (with efficiencies in a range of 1% to 5%), offer the promise of low-cost PV and easier mass production. Nanotechnology, including quantum dots, nanotubes and buckyballs, has the potential for improved efficiencies derived from having feature sizes less than the wavelengths of light. As promising as these new technologies are, most are restricted to collecting light using discrete quantum energy bands, which imposes the same inherent efficiency limitations as semiconductor PV technologies. Increasing the number of junctions or wells increases the number of bandgaps and increases the useable energy, which results in increased efficiency across the visible light spectrum. As with inorganic semiconductors, this approach has a downside because each new well or junction creates a layer that can interfere with (mask) the well or junction below it and increase the path length of both the light and the free charge, which increases the losses from absorption and electrical resistance. Furthermore, nanotechnology and quantum dots still have issues with toxicity, with the ability to manufacture and with efficiency.

Recent work in field effects for photodetectors shows that the electromagnetic (EM) fields of light can be locally enhanced by physical features of the photodetector design. Using the wave nature of light, the electric portion and the magnetic portion of the light wave can be slowed or enhanced using geometry and using the interface between a conductor and insulator or dielectric. See, for example, U.S. Pat. No. 6,344,272 to Oldenburg et al. for Metal Nanoshells, which discloses how metal-coated nanospherical particles can create collective coupling of electrons to an incident electromagnetic wave. The size of the particle and the metal determine the characteristics of this coupling, which is also called a plasmon wave. U.S. Pat. No. 6,344,272 discloses that the plasmon wave creates a strong local field enhancement in the interior of the metal sphere. Enhanced fields from plasmons can be used in detection and frequency modulation as taught, for example, in U.S. Pat. No. 6,180,415 to Shultz et al. for Plasmon Resonant Particles, Methods and Apparatus.

Field enhancement can be created using interference and creating a waveguide using plasmons. Plasmons occur at the interface of a metal and a dielectric. Under the right circumstances, light waves can induce resonant interactions between the waves and the mobile electrons at the surface of the metal. The interactions generate surface plasmons, which are discussed in Maier and Atwater, *Plasmonics: Localization and Guiding of Electromagnetic Energy in Metal/Dielectric Structures*, Journal of Applied Physics, Vol. 98, No. 1, Article No. 011101, July 2005. Therefore, using selective geometries on the surface metals can induce frequency dependant resonant absorption.

SUMMARY OF THE INVENTION

The system and method disclosed herein improve the collection efficiency of electromagnetic radiation in general and more specifically the collection efficiency of visible light by 1) removing the quantum bandgap restrictions and utilizing a spectrum of electromagnetic radiation (e.g., for visible wavelengths, utilizing the entire visible and near visible spectrum, and 2) lowering the resistance of the free electrons. Additionally, the disclosed system and method do not require semiconductor materials, which results in devices that can be significantly less expensive than traditional semiconductor based photovoltaics.

The disclosed system and method uniquely collect electromagnetic energy using enhanced fields to create electron emission. The system and method use feature sizes on the scale of the incident electromagnetic wave to generate localized field enhancements in conductors to capture the energy from the electromagnetic spectrum. The electric field is captured in the conductor with the geometry of the device creating a region of high field strength. The strength of the field is sufficient to cause electron emission across a gap to a ground plane, creating a potential difference and a current. The system and method are particularly useful for visible light, where the entire spectrum can be captured using a single geometry. The system and method can also be used for lower frequency spectrums such as infrared and can also be used for the higher frequency spectrum of ultraviolet.

The system and method can be used in many applications including solar energy collection, sensors and concentrated electromagnetic energy collection. The system and method can be used for many applications that require electric power or for other novel electromagnetic sensor applications.

The electromagnetic collecting region comprises an array of waveguides across a plane. The waveguides are tailored to the electromagnetic spectrum to be collected. Preferably, the waveguides comprise sloping structures, such as conical structures, that enable the collection of multiple wavelengths. In certain preferred embodiments, the collecting structure is conical with a circular cross section; however, the collecting structure may also have other shapes, such as, for example, a square, a pentagon, or the like. The tapered cross section of the collecting structure creates nodes at multiple locations along the surface. A preferred configuration packs many conical structures closely together such that a substantial portion of a collecting surface is covered by cones. In certain applications, structures such as hexagons may be more advantageous for increasing the packing density. Additional modification could include nonuniform regions to change the resonance areas or to create nodes to enhance particular frequencies over others.

The conical structures are inverted such that the base of the structure is at the top and the structure tapers downwardly. The base at the top faces the source of solar or other light energy. Preferably, the top base diameter (or other cross-sectional dimension) is on the order of the longest wavelength of collected light, which may comprise the infrared (IR) portion of the electromagnetic spectrum or the visible through ultraviolet (UV) portion of the spectrum. For visible and infrared light, the waveguide base, the wavelength is in a range of approximately 900 nanometers to 750 nanometers. The wavelengths are shorter for ultraviolet light. The sloping conical geometry creates an environment where each wavelength of the incident spectrum has a trap region with a respective diameter in the cone corresponding to each wavelength of light.

Each waveguide comprises a conductor with a thickness determined by the desired collection properties. In a preferred embodiment, the thickness is on the order of the wavelength of electromagnetic skin depth in the conducting medium. Certain conductors useable for the walls of the waveguides include metals such as gold, silver, copper and aluminum. Other non-metallic materials can also be used. For example, graphene has unique relativistic quantum electrodynamic properties that create a very low-resistance light trap. The conducting layer is supported by either a dielectric such as $SiO_2$ or some other easily manufactured material such as plastic or another nonconducting medium.

In an optional mode, multiple conductors or multiple metal layers are used to modify the plasmon wave generated at the interface between the different material layers. Standing waves in the metal coupled with a plasmon wave at the dielectric/metal or bimetal interface create the high field region at the tip of each conical structure. The plasmon wave at the conducting material interfaces creates a waveguide along the cone for shorter wavelength light that has not yet reached the region of the cone that matches its wavelength. The enhanced field coupled to the isolated tip structure of the cone creates a localized high field area where electrons are emitted across a gap. The gap is tailored to the device based on the dielectric strength of the gap and the required operating voltage of the device. In a particularly preferred configuration for visible light, the gap distance is less than 100 nanometers, with optimum performance below 30 nanometers.

The enhanced field causes electrons from the conducting cathode to jump across the gap to the anode or ground plane. The electron current is defined by the intensity of light, resistive loses, the dielectric material, the distance between the two conductors and the enhanced field at the point. The voltage is a function of the field strength and the dielectric material or vacuum gap. The resistive losses are negligible compared to semiconductor material. The only resistance across the gap occurs if a dielectric is in the gap. If present, the resistance is small because of the short distance (e.g., tens of nanometers) between the cathode and anode.

A ground plane, or anode, collects the emitted electrons. The ground plane is connected to a load. The load is advantageously a motor, a battery, a storage device or any other device that uses the electrical energy generated by the solar energy collector disclosed herein.

In certain embodiments of the system and method, the cathode and anode are connected to a voltage source that changes the field between the cathode and anode. This connection may increase the voltage or increase the electron current for various types of application loads.

BRIEF DESCRIPTION OF THE DRAWINGS

A system and method in accordance with aspects of the present invention is disclosed herein in accordance with the attached drawings in which.

DETAILED DESCRIPTION OF PREFERRED EMBODIMENTS

The drawings and the following description illustrate preferred embodiments of a system and method for implementing the present invention. Other shapes and configurations may also be used to create the disclosed effect of collecting the electric field from the electromagnetic wave and funneling the electric field to a localized field region above a conducting plane were electrons are emitted from the distress field point or line.

Figure 1:
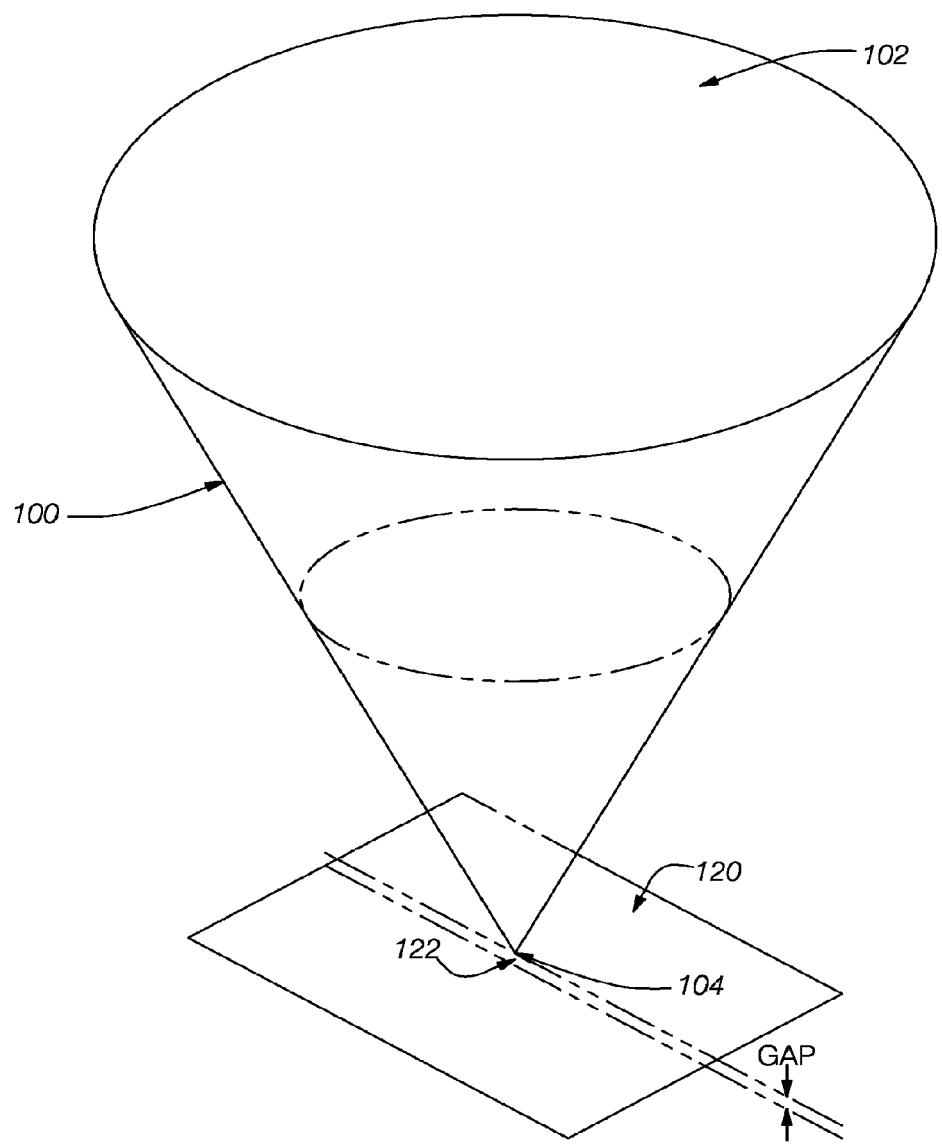
FIG. 1 illustrates a perspective view of an embodiment of a conical waveguide collecting structure wherein light (or energy at another wavelength of the electromagnetic spectrum) enters from the top into the cone, which is the base of the inverted conical structure.

FIG. 1 illustrates a perspective view of a conical waveguide collecting structure 100 of a preferred embodiment of the system and method disclosed herein. The collecting structure comprises a conducting material that tapers from a base 102 to a point 104. Preferably, the conducting material is a thin conducting film. For example, the conducting material advantageously comprises graphene (a honeycomb crystal lattice of densely packed carbon atoms in a one-atom-thick planar sheet) or other carbon materials that are electrical conducting. The conducting material may also be another conducting material such as an electrically conducting metal. Preferably, the thickness of the conducting material is on the order of the wavelength of electromagnetic skin depth in the conducting medium.

As illustrated in FIG. 1, the collecting structure 100 is inverted such that the base 102 is located at the top and the point 104 is located at the bottom. The cone is "open" at the top such that the base is transparent to electromagnetic energy (e.g., light). The cone may be filled with an optically transparent material. The base is directed toward the sun or other source of light or electromagnetic energy such that light (or energy at another wavelength of the electromagnetic spectrum) enters the cone via the top and propagates toward the tip. The base of the illustrated embodiment is circular; however, other embodiments may advantageously incorporate non-circular bases to create node points within the cone. Unlike typical waveguides, a common feature of the disclosed waveguides is that the waveguide tapers to a point. In other configurations having a non-circular cross section, the waveguide may taper to a line.

Figure 2:
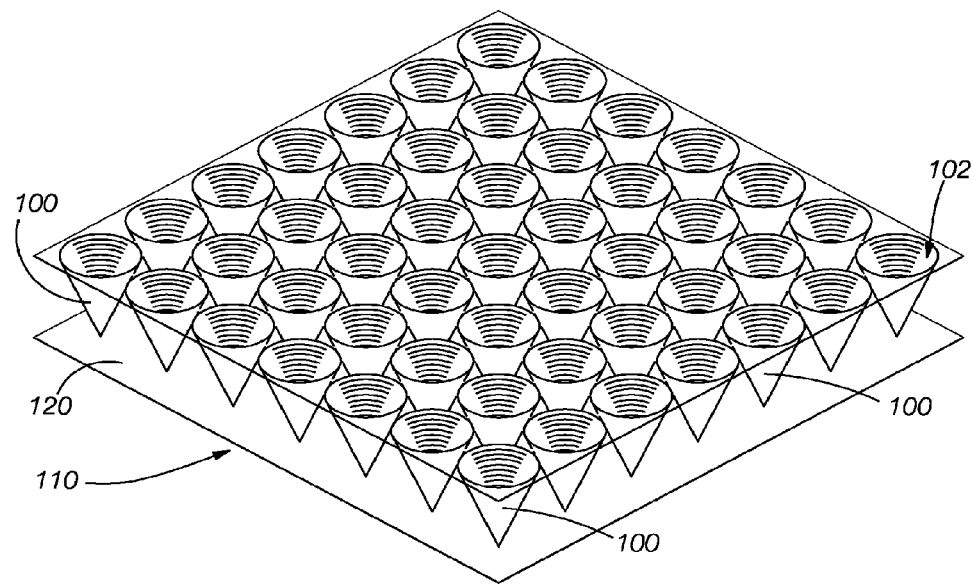
FIG. 2 illustrates a perspective view of an array of waveguides.
Figure 3:
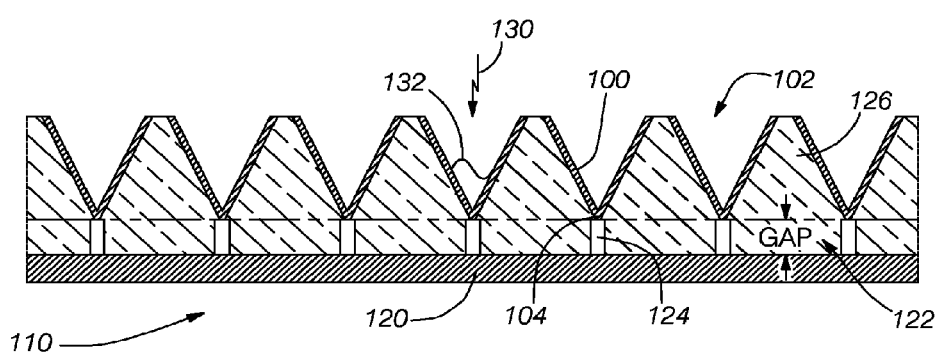
FIG. 3 illustrates a cross-sectional elevational view of the array of waveguide cathodes of FIG. 2 and shows a dielectric between the cathodes and a conducting ground plane (anode)

FIG. 2 illustrates a perspective view of an array 110 of waveguides 100. FIG. 3 illustrates a cross-sectional elevational view of the array of waveguides of FIG. 2. As discussed below, each waveguide functions as a cathode. Preferably, the waveguides are formed in a dielectric substrate 126. As shown in FIG. 3, the tip 104 of the waveguide (cathode) is spaced apart from a conducting ground plane (anode) 120 by a gap (or standoff layer) 122. The gap preferably comprises the same material as the dielectric substrate. The conducting ground plane comprises an electrical conductor and functions as an anode. In the embodiment of FIG. 3, a respective electron emission region 124 is positioned in the gap between each cathode and the anode.

As discussed above, the electromagnetic waves are incident from above the broad open end (base) of each individual conical waveguide 100. As shown in FIG. 3, each incident electromagnetic wave 130 creates a mirror electric field in the waveguide comprising the electrically conducting material. The light is reflected or guided inward via plasmon waves created at the interface of metal until the dimension of the tapered cross section (e.g., the diameter for a cone having a circular base) equals the wavelength of the electromagnetic wave. The matching dimensions create a standing wave that partially traps a wave 132 as shown in FIG. 3. The electric field generated in the conductive waveguide by the wave is combined with the electric fields created by electromagnetic energy at other wavelengths to create a high field at the point 104 at the tip of the conical waveguide. The entire waveguide structure functions as a cathode or electron emitter. With sufficient localized field strength at the cathode tip, the electrons overcome the work function of the metal to jump across the gap 124 to the ground plane (anode) 120.

In preferred embodiments, to minimize resistance and to prevent electron return from the anode 120 to cathode point 10, the respective emission region 124 between the cathode tip and the anode is either a vacuum or is filled with an inert gas. The gas (e.g., argon) is chosen based on the field strength, which is a function of the geometry and the intensity of the incident electromagnetic wave.

As illustrated by the embodiment of FIG. 3, the dielectric standoff 122 is advantageously used to support the required distance between the tip 104 of the cathode 100 and the anode 120. The choice of materials for the dielectric standoff is determined in part by one or more of the dielectric field strength, and the manufacturing cost. For example, silicon oxides, plastic and ceramics may be advantageously used as the dielectric standoff. A preferred distance between the cathode tip 104 and the anode (ground plane) 120 is less than 100 nanometers. A particularly preferred distance is in a range of 10 nanometers to 30 nanometers. Smaller distances may also be used but are currently difficult to manufacture.

Figure 4:
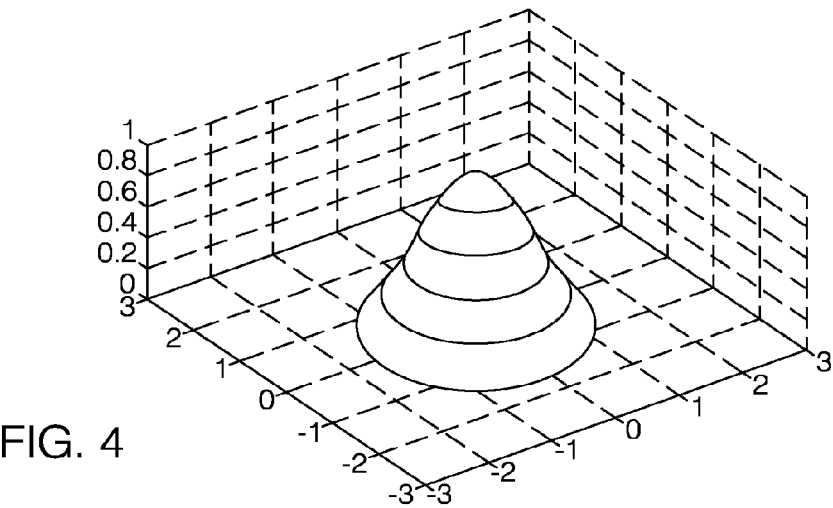
FIG. 4 illustrates the enhancement of the electric field at the tip of the collecting cone.

FIG. 4 illustrates the enhanced field at the tip 104 of the waveguide 100. In FIG. 4, the tip of the waveguide is pointing upward for convenience in presenting the graph. The units in FIG. 4 are normalized with respect to a maximum field at the location of the tip positioned at relative coordinates 0, 0.

When the free electrons in a the electrically conducting material in the cathode or waveguide 100 react with the electric field of the electromagnetic wave, the free electrons oscillate at the frequency of the electromagnetic wave, as long as the plasma frequency for the metal is above the electromagnetic wave frequency. Infrared electromagnetic field collection has been demonstrated by the Idaho National Laboratory (INL), a laboratory operated by the US Department of Energy (DOE). The device is manufactured using tiny antennas imprinted using gold on a plastic thin film and is described by Robert F. Service, *Membrane Makes Plastic Precursor Deliver More Bag for the Buck, Science*, Vol. 320, No. 5883, page 1584, 20 Jun. 2008, DOI: 10.1126/science.320.5883.1584a.

Figure 5:
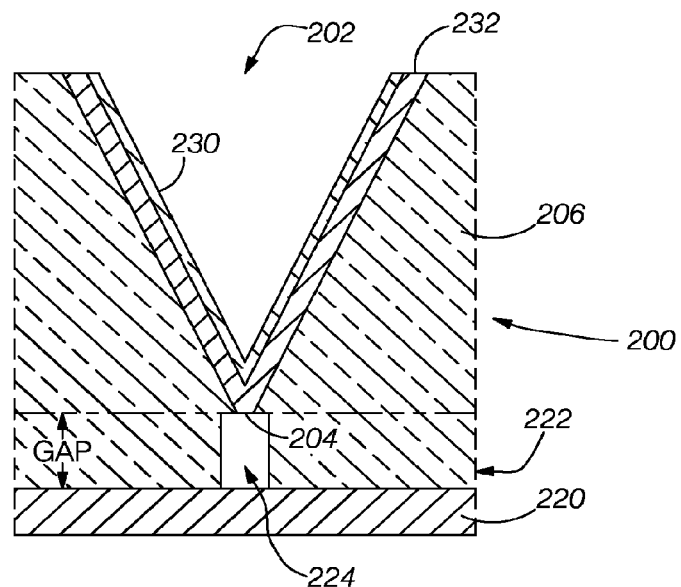
FIG. 5 illustrates a detailed cross-section of one waveguide collector with a dielectric layer over the metal layer.

FIG. 5 illustrates a detailed cross-section of an embodiment of a conical waveguide collector 200 having an upper base 202 and a lower tip (cone point) 204 supported by a dielectric substrate 206. The tip is spaced apart from a ground layer (anode) 220 by a gap 222 as in the embodiment described above. In certain preferred embodiments, an emission region 224 is formed in the gap, as discussed above. The wall forming the waveguide collector comprises a dielectric layer 230 over a metal layer 232. The electric field propagation to the cone point is enhanced by creating a plasmon wave at the surface interface of the metal of the waveguide and the covering dielectric layer. Plasmon surface waves create a coupling of the light wave to the metal surface wave, thereby creating a waveguide. The plasmon wave is dependent on frequency, material and thickness. Plasmons are discussed in detail in Maier and Atwater (cited above) and in Dione, Sweatlock, Atwater and Polman, *Plasmon slot Waveguides: Towards chip-scale propagation with subwavelength-scale localization, Physical Review* B 73, 035407 (2006). Surface plasmons are generated at the interface of conducting and insulating media and interact with light creating polaritons. A polariton results from a strong coupling of electromagnetic waves with an electric or magnetic dipole carrying exciton. The plasmon surface wave is enhanced or modified by placing the thin dielectric layer or another different conducting material over the metal layer as shown in FIG. 5. Surface plasmon waves that traverse a dielectric and conducting interface can be controlled by features on the surface as shown in Pendry, Martin-Moreno, Garcia-Vidal, *Mimicking Surface Plasmons with Structured Surfaces, Science* 305, 847 (2004); DOI: 10.1126/science.1098999.

The varying cross-sectional diameter of the preferred embodiment of the conical waveguide 100 (or distance across a cross section for other shapes) is preferably on the order of the wavelength of the electromagnetic radiation being collected. For collecting visible light, the inner diameter of the cone preferably varies between approximately 700 nanometers to 400 nanometers. The diameter may be a multiple of the preferred wavelengths for other applications. The inner diameter closest to the point may be sufficiently small so the cone is able to collect electromagnetic energy into the ultraviolet range.

Preferably, the conical waveguide comprises an electrically conducting metallic medium that has a plasma frequency above the desired collecting frequency of light. Light having a frequency above the plasma frequency is transmitted (the electric field would not be mirrored in the metal) because the electrons cannot respond fast enough to screen the field from the photon. Light below the plasma frequency is mirrored. The plasma frequency, $\omega_{pe}$, in radians per second, is defined as:

$$\omega_{pe} = \left(\frac{n_e e^2}{\varepsilon_o m_e}\right)^{1/2} \text{rad/s}$$

where $n_e$ is the electron density, e is the electric charge, $\varepsilon_o$ is the permittivity of free space and me is the mass of an electron. The frequency is then just $fp=\omega_{pe}/2\pi$.

In most metals, the plasma frequency is in the ultraviolet, making these metals shiny (reflective) in the visible range. Metals such as silver and aluminum, for example, are good candidates for visible light collectors. On the other hand, some metals, such as copper, have a plasma frequency in the visible range, yielding a distinct yellow color. Such metals are less favorable materials for full spectrum collection, but are good candidates for applications where higher frequency light needs to be filtered out. In such applications, the disclosed system acts as a sensor for light of a particular frequency. The plasma frequency of metals and material are known by those in the art and are chosen depending on the spectrum of electromagnetic radiation that is to be collected.

Localized field enhancement from sharp, geometrical points above conducting planes is a well-known phenomenon. Electron discharge from photon excitation off a point plane gap, has been demonstrated by M. Laan, J. Aarik, R. Josepson and V. Repän, *Low current mode of negative coronas: mechanism of electron emission, J. Phys. D: Appl. Phys.*, 36, 2667-2672, 2003, and by V. Repän, M. Laan and T. Plank, *Electric Field Modeling for Point-Plane Gap, Institute of Experimental Physics and Technology*, University of Tartu, Tähe Estonia publication, 2002. Laan et al. evaluated the effects of discharges of various point materials across a conducting plane from irradiation with light, while Repan et al. studied the voltages required to allow the electron to overcome the work function of the material. Both papers show that enhanced fields generated by photon irradiation can create electron discharge from a conducting point over a conducting plane. P. Dombi and P. Rácz, *Ultrafast monoenergetic electron source by optical waveform control of surface plasmons, Optics Express*, Vol. 16, No. 5, pages 2887-2893, 3 Mar. 2008, showed that plasmon waves could generate enhanced photoelectron emission. Mark I. Stockman, Matthias F. Kling, Ulf Kleineberg and Ferenc Krausz, *Attosecond nanoplasmonic-field microscope, Nature Photonics*, Vol. 1, pages 539-544, Sep. 3, 2007, showed that electron emission from a surface that had nanostructures is enhanced by the plasmons generated by the structure itself. In Stockman et al., raised surfaces create high field regions that enhanced electron emission.

Figure 6:
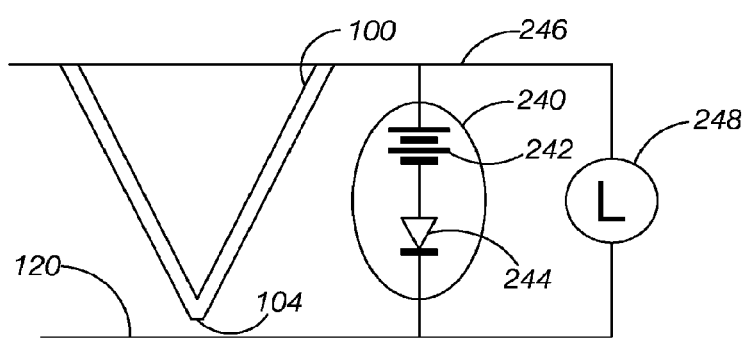
FIG. 6 illustrates an electrical circuit for a variation of system that uses a low current or zero current voltage source to increase the voltage across the gap between the ground plane and electron emitting tip of the collecting structure.

When the field is sufficient or the localized electron density is sufficient, electrons are emitted from the tip 104 of the cathode (waveguide) 100 to the anode (ground plane) 120 in the embodiment of FIGS. 1-3. The field can be actively enhanced by placing a high-resistance voltage source (not shown) in parallel with the cathode to anode path. Alternatively, as shown in FIG. 6, a voltage source 240 comprises a DC source (e.g., a battery) 242 in series with a diode 244. The diode blocks the reverse current path through the battery. The voltage source is positioned in parallel with the cathode-toanode path between a top conducting plane 246 and the anode. The top conducting plane interconnects the plurality of waveguides 100 (FIG. 2). A load 248 is connected between the top conducting plane and the anode (ground plane). The embodiment illustrated in FIG. 6 is particularly useful when the waveguides are used in low intensity environments such as in sensor applications or when the electron density at the tip is insufficient for electron emission. In alternative embodiments (not shown), two or more waveguides may be placed in series to increase the generated voltage.

In preferred embodiments, the plurality of conical waveguides 100 of FIGS. 2-3 are tightly packed to occupy as much of the surface area as possible in order to maximize the collection area. The current produced by the multiple waveguides is a function of the light intensity, the energy associated with the spectrum and the overall resistance. The multiple waveguides are manufactured using simple materials that embed the conical geometry in a double metal dielectric layer similar to Mylar sheets. The thickness is preferably less than one micron; however, a thicker anode is used to provide structural support. As discussed above, a vacuum or gas (e.g., argon) is preferably embedded in the emission region 124 between the tips 104 and the ground plane 120. The distance between the tips and the ground plane are advantageously maintained by insulating standoffs 122. The embedded gas or vacuum in the emission region reduces the electron resistance and thus lowers the field strength required to emit the electron.

Applications using visible light are broad and include any application requiring electrical energy where the system can be exposed to light, such as, for example, buildings, cars, electronics, and the like. Applications are not limited to outdoor applications because the system can be positioned anywhere sufficient light is available. The system is advantageously enhanced using light focusing techniques including mirrors or Fresnel lenses. Other applications include refueling aircraft using infrared or microwave energy, with conical sizes on the order of the intended wavelength of electromagnetic radiation. For lower frequency applications, the intensity is increased to generate strong enough localized fields since the energy per photon is lower at lower frequencies.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A device for collecting electromagnetic energy, comprising:
    an anode; and
    at least one waveguide spaced apart from said anode, said at least one waveguide comprising a first end and a second end, said first end having a first cross-sectional dimension and said second end having a second cross-sectional dimension that is smaller than said first cross-sectional dimensional, said at least one waveguide having at least one other cross-sectional dimension that is between said first cross-sectional dimension and said second cross-sectional dimension, which other cross-sectional dimension corresponds to a wavelength of electromagnetic energy,
    wherein said at least one waveguide is adapted to (i) capture and enhance an electric field from said electromagnetic energy to create a high, localized electric field, and (ii) interact said electromagnetic energy with an inner surface of the at least one waveguide to generate an emission of electrons to said anode.

2. The device of claim 1, wherein the at least one waveguide is part of a plurality of waveguides arranged in an array of waveguides.

3. The device of claim 1, wherein:
    the at least one waveguide is conical;
    the second cross-sectional dimension is at a tip of the waveguide that forms a cathode of the waveguide; and
    the cathode is spaced apart from the anode.

4. The device of claim 3, wherein the cathode is spaced apart from the anode by a distance that is less than about 100 nanometers.

5. The device of claim 3, wherein the cathode is spaced apart from the anode by a distance that is less than the wavelength of said electromagnetic energy.

6. The device of claim 1, wherein said at least one waveguide is spaced apart from said anode by a gap.

7. The device of claim 6, wherein said gap is under vacuum.

8. The device of claim 6, wherein said gap comprises a gas.

9. The device of claim 1, wherein said inner surface comprises a material with a plasma frequency that is above the frequency of said electromagnetic energy.

10. The device of claim 9, wherein said at least one waveguide is adapted to enhance the electric field along a conductor of said inner surface.

11. The device of claim 9, wherein said inner surface includes graphene, gold, silver, copper or aluminum.

12. The device of claim 1, wherein said at least one waveguide comprises a dielectric layer adjacent to a metal layer, wherein said dielectric layer comprises said inner surface, and wherein said at least one waveguide is adapted to create a plasmon wave at a surface interface of said metal layer and said dielectric layer upon exposure to said electromagnetic energy.

13. A system for collecting electromagnetic energy, comprising:
    an anode; and
    an array of waveguides, wherein an individual waveguide of said array is spaced apart from said anode, wherein said individual waveguide comprises a first end and a second end, said first end having a first cross-sectional dimension and said second end having a second cross-sectional dimension that is smaller than said first cross-sectional dimensional, said at least one waveguide having at least one other cross-sectional dimension that is between said first cross-sectional dimension and said second cross-sectional dimension, which other cross-sectional dimension corresponds to a wavelength of electromagnetic energy,
    wherein said at least one waveguide is adapted to capture and enhance an electric field from said electromagnetic energy to create a high, localized electric field.

14. The system of claim 13, wherein:
    the at least one waveguide is conical;
    the second cross-sectional dimension is at a tip of the waveguide that forms a cathode of the waveguide; and
    the cathode is spaced apart from the anode.

15. The system of claim 13, further comprising a load coupled to said anode.

16. The system of claim 13, further comprising a storage device coupled to said anode.

17. The system of claim 13, wherein the at least one waveguide is a sensor.

18. The system of claim 13, wherein said at least one waveguide is spaced apart from said anode by a gap.

19. The system of claim 18, wherein said gap is under vacuum.

20. The system of claim 18, wherein said gap comprises a gas.

* * * * *

UNITED STATES PATENT AND TRADEMARK OFFICE
CERTIFICATE OF CORRECTION

| | | |
|---|---|---|
| PATENT NO. | : 8,969,710 B2 | Page 1 of 1 |
| APPLICATION NO. | : 13/932936 | |
| DATED | : March 3, 2015 | |
| INVENTOR(S) | : Phillip J. Layton | |

It is certified that error appears in the above-identified patent and that said Letters Patent is hereby corrected as shown below:

In the Claims,

At column 9, Claim 1, line 58, please replace "dimensional" with -- dimension --.

At column 10, Claim 13, line 46, please replace "dimensional" with -- dimension --.

Signed and Sealed this
Second Day of June, 2015

Michelle K. Lee
*Director of the United States Patent and Trademark Office*